T. C. FOLEY.
CHUCK AND TOOL HOLDER.
APPLICATION FILED SEPT. 16, 1920.
1,420,029.
Patented June 20, 1922
3 SHEETS—SHEET 1.
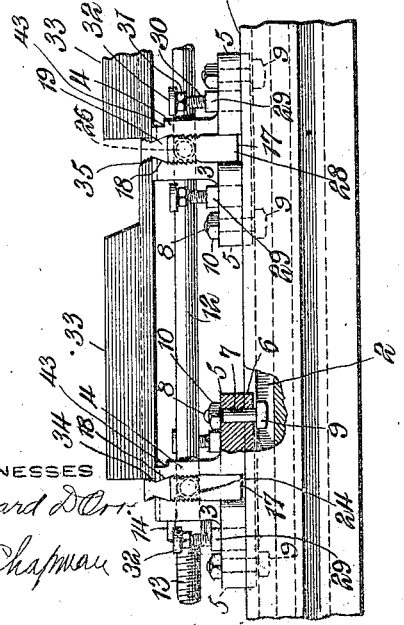
T. C. Foley, INVENTOR,
BY *[signature]*
ATTORNEYS
WITNESSES
*[signature]*
*[signature]*

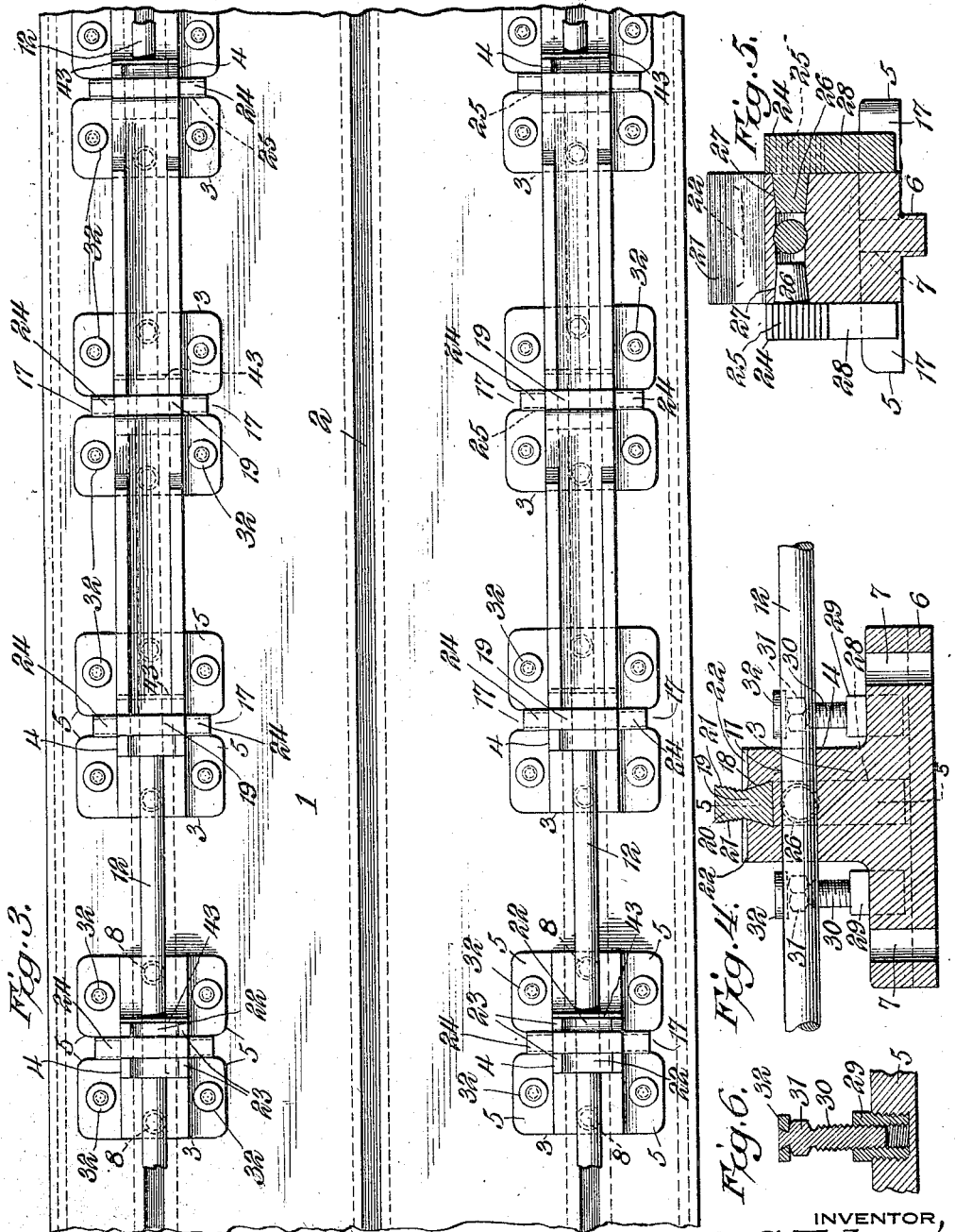

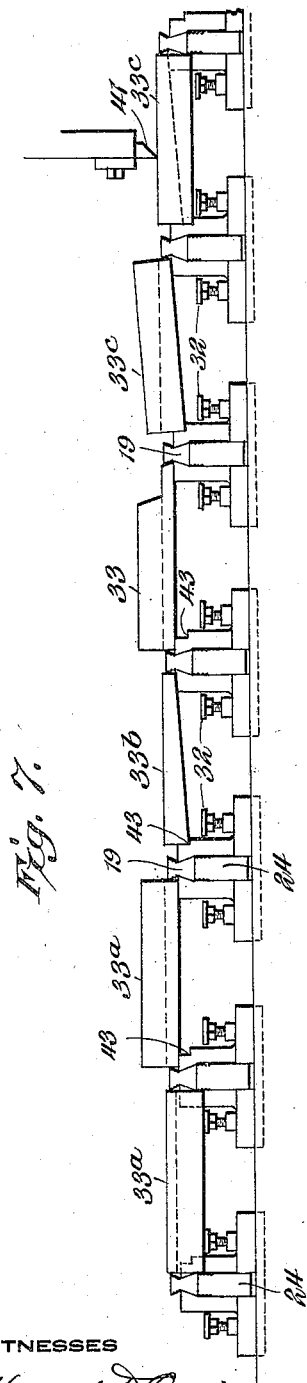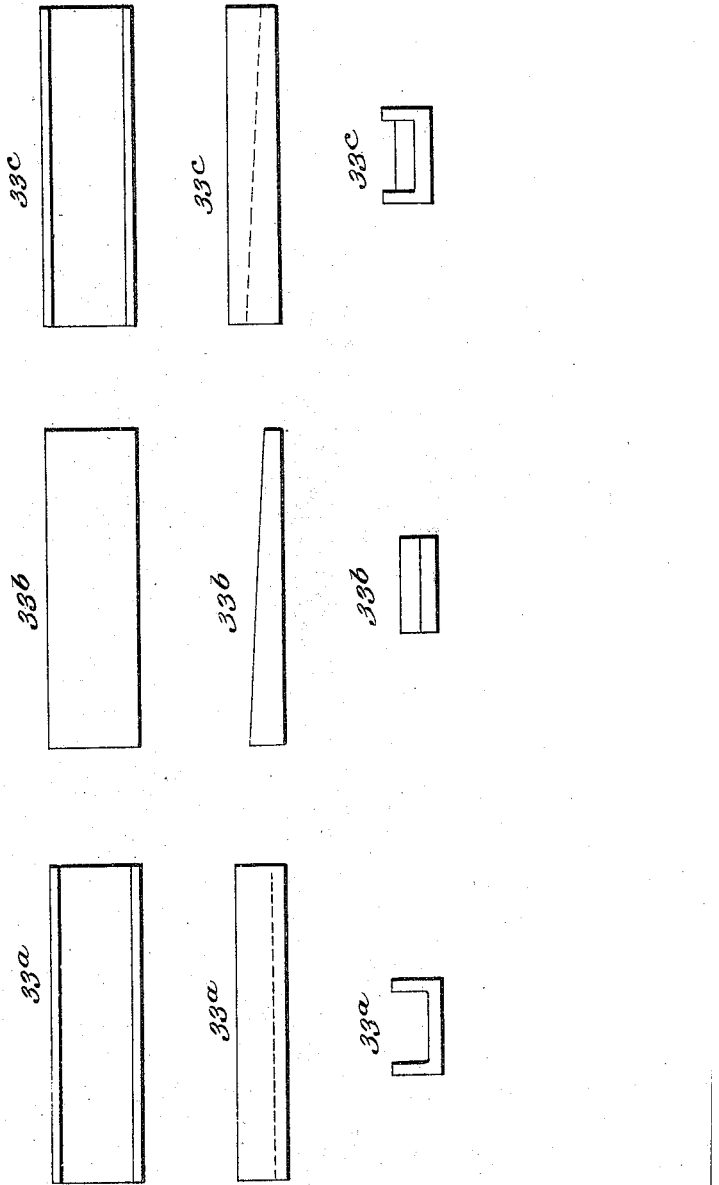

UNITED STATES PATENT OFFICE.

TIMOTHY C. FOLEY, OF RENOVO, PENNSYLVANIA.

CHUCK AND TOOL HOLDER.

1,420,029.   Specification of Letters Patent.   Patented June 20, 1922.

Application filed September 16, 1920. Serial No. 410,659.

*To all whom it may concern:*

Be it known that I, TIMOTHY C. FOLEY, a citizen of the United States, residing at Renovo, in the county of Clinton and State of Pennsylvania, have invented a new and useful Chuck and Tool Holder, of which the following is a specification.

This invention refers to chucks and tool holders for planing purposes and is designed for use in connection with planers of a size capable of operating upon a large number of units at one time.

While not confined to any particular type of work the invention is especially adapted for planing interior and exterior horizontal and vertical portions of shoes, wedges and the like used in locomotive pedestals and in other situations, where rapidity and accuracy of the work is desirable, the construction being such that numerous pieces of work may be fastened to the planer table and finished without changing the position of the work.

These desirable qualities are brought about by the invention by providing a chuck capable of holding numerous pieces of work in tandem and by providing a tool holder capable of carrying tools operating at one time upon various portions of the work.

The invention will be best understood from a consideration of the following detailed description taken in connection with the accompanying drawings forming part of this specification, with the understanding, however, that the invention is not confined to any strict conformity with the showing in the drawings, but may be changed and modified so long as such changes and modifications mark no material departure from the salient features of the invention as expressed in the appended claims.

In the drawings:

Fig. 1 is a side elevation, with some parts in section and other parts broken away, of a chuck arranged to carry numerous pieces of work which, in the figure, are shown as locomotive pedestal shoes.

Fig. 2 is an end view of the planer bed showing two chucks in place with rows of shoes clamped therein and the tool holders in position to act upon those surfaces of the shoes to be planed.

Fig. 3 is a plan view of the structure shown in Fig. 2 but omitting the tool holders.

Fig. 4 is a longitudinal section of one of the clamp heads of the chuck.

Fig. 5 is a section on the line 5—5 of Fig. 4.

Fig. 6 is a vertical section of an adjustable support for the work.

Fig. 7 is an elevation of a multiple chuck showing the adaptability thereof.

Figs. 8, 9 and 10 are various views of different types of work.

Referring to the drawings there is shown a planer table 1 provided with longitudinal undercut or inverted T slots 2, both the table and its slots following the usual practice and hence needing no particular description. Adapted to the table is a suitable number of blocks 3 constituting supports for shoes such as are used on locomotives and termed pedestal shoes, but which may be replaced in the planer by wedges or pieces of miscellaneous work as needful or desirable.

Each block 3 is formed with an intermediate stem or post of a suitable width and height and provided with a base 5 extending on opposite sides of the post 4 and furnished with an intermediate longitudinal rib 6 adapted to fit snugly yet freely in one of the slots 2. The base 5 is furnished near each end with a bolt hole 7 to be traversed by a bolt 8, the head 9 of which is square and is located in the undercut portion of the slot 2, and a nut 10 is applied to the other end of the bolt above the corresponding portion of the base 5. In this manner, the blocks 3 may be securely fastened at any point along any one of the grooves 2. Extending through the post 4 in a direction lengthwise of the base 5 is a hole or passage 11, and when a suitable number of blocks 3 is assembled upon the planer the passages 11 are in alinement and are traversed by a rod 12 long enough to extend at each end beyond the post 4 of the terminal blocks. Each end of the rod 12 is screw threaded, as shown at 13, and a nut 14 is applied thereto, while a spacer sleeve or sleeves 15 may be applied to one end of the rod 12 for take-up purposes, the corresponding nut 14 where adjacent to the sleeve 15 having a washer 16 interposed.

The base 5 is wider than the post 4 and there are recesses 17 on opposite sides of the post 4. In the upright plane of the recesses 17 and extending crosswise of the length of the block 3 is a dovetail groove or seat 18 in which is fitted a dovetail tongue 19 of a jaw 20 having toothed or serrated side faces 21 slightly expanding as they from the top of the post 4. The upper of the post 4 on opposite sides of the jaw 20 has sunken portions 22 leaving terminal rest surfaces 23 upon which work may be supported, this being particularly valuable where the surface of the work engaging the post is rough. Adapted to opposite sides of each post 4 is an upright work engaging jaw 24 toothed or serrated on the upright face designed to engage work, the toothed face being indicated at 25. The jaws 24, when formed separately from the post 4, have taper pins 26 fitting taper sockets 27 in the body of the post. When desirable the jaws 24 may be made in one piece with the posts 4, in which case the taper pins 26 are omitted. The jaws 24 are prevented from turning by having their lower ends 28 fitting in the recesses 17.

Tapped into the base 5 on opposite sides of and spaced to the front and rear of the post 4 are screw bushings 29, each interiorly threaded for the reception of an adjusting screw 30 provided at the upper end with a square or other suitably shaped head 31 provided with a swivel termination 32 adapted to receive and support the work at a suitable height with respect to the teeth 25 of the jaws 24.

In order to secure on the planer table the work to be planed, which work may consist of locomotive pedestal shoes 33 as shown in Figs. 1, 2 and 3, the bolt or rod 12 is loosened by unscrewing either or both of the nuts 14, and the blocks 3 are distributed along the rod with the bolts 8 loose, but still tight enough, to prevent the blocks from being materially disturbed. The pedestal shoes 33 are then assembled between the jaws 20, with end portions 34 and 35 of the pedestal shoes engaging or closely approaching the serrated or roughened faces 21. Now by tightening up the nuts 14, or one of them, the blocks 3 are all caused to approach until the shoes are tightly clamped between the jaws 22, after which the bolts 8 may be finally tightened to hold the blocks 3 in place without dependence upon bolt or rod 12.

For some work the screws 30 are relied upon and the swivel ends are raised high enough to cause the work to be engaged by the jaws 24 along their serrated or roughened faces 25.

The jaws 20 and 24 provide means for clamping a great variety of articles to hold them in position for treatment by planer tools.

In order to treat a row or gang of articles representing the work and positioned and clamped in alinement on the planer table, there is provided a combination tool holder 36, shown in Fig. 2. This tool holder has a saddle portion 37 terminating in depending arms 38, provided with tool heads 39 for the reception of cutting tools 40 so arranged that their edges may be brought into engagement with the outer side walls or faces of the pedestal shoes 33. There is also provided another, intermediately located, planer tool 41, so arranged that it may operate upon inner channel portions 42 of the pedestal shoes 33. With such an arrangement the inner and outer surfaces of the shoes may be simultaneously acted upon by the planer, and as the latter is capable of treating quite a large number of pedestal shoes at one time the entire work may be done accurately and expeditiously.

The general shape of pedestal shoes and wedges varies for certain classes of locomotives. In Fig. 8, there is shown a plan view, a side view and an end view, of a pedestal shoe $33^a$ of channel form with the shoe of the same height throughout instead of having one end cut off as in the case of the pedestal shoe 33. In Fig. 9, there is shown a wedge block $33^b$ in plan, side elevation and end view, the wedge block $33^b$ being a plain wedge. In Fig. 10, there is shown a similar wedge block $33^c$ in plan, side elevation and end view, except that the wedge block is of channel form.

In Fig. 7, the chuck is shown supporting a series or gang of blocks being planed and held in the chuck in different positions, illustrating the adaptability of the chuck for operating upon different articles at one time. In the case of wedges, the post 4 is provided with a notch or recess 43, permitting the inclination of the wedge so that the tool 41 will plane the inclined face of the wedge.

What is claimed is:

1. The combination with a planer table of a planer chuck comprising a plurality of blocks adjustable on the table and each having means for securing it on said table in adjusted position, a clamp rod common to and traversing all the blocks, and work engaging jaws individual to the blocks and provided with serrated or roughened engaging faces for holding and alining work between the blocks.

2. The combination with a planer table, of a planer chuck comprising a plurality of elongated blocks each slidable along the table and each having an intermediately located post thereon, and means for securing the block on the table in adjusted positions, a clamp rod common to and traversing all the blocks, and work engaging jaws on the blocks for holding work between them.

3. In a planer, a planer chuck for holding a series of articles to be planed, said chuck comprising a series of blocks with work engaging jaws thereon, to engage and clamp a series of articles constituting the work, and means for bringing the jaws simultaneously into clamping engagement with the articles to be planed.

4. In a planer, a planer chuck comprising a series of blocks for alined association, each block having a basic portion and a post thereon, and also provided with a clamping jaw having clamping faces to engage the work, each block having a hole or passage in position to aline with similar holes or passages in other like blocks, and a single clamp rod for clamping a series of articles simultaneously between the blocks.

5. In a planer, a planer chuck comprising a plurality of blocks, each with an intermediate post having a transverse seat at the top and a jaw lodged in the seat and extending transversely of the block above the post and providing ledges on each side of the jaw for supporting the work and a single connecting means for the blocks.

6. In a planer, a planer chuck comprising a plurality of blocks, each with an intermediate post having a transverse seat at the top and a jaw lodged in the seat and extending transversely of the block above the post and providing ledges on each side of the jaw for supporting work, the jaw where extending above the post being provided with roughened or serrated faces for engaging work and means common to all the blocks, for clamping them together.

7. In a planer, a planer chuck comprising a plurality of blocks, each with an intermediate post having a transverse seat at the top and a jaw lodged in the seat and extending transversely of the block and above the post and providing ledges on each side of the jaw for supporting work, the jaw where extending above the post being provided with roughened or serrated faces for engaging the work, and said post also having other jaws on opposite sides and the block having supports for work engaging the side jaws of the block.

8. In a planer, a planer chuck comprising a plurality of blocks adjustable toward and from each other lengthwise of the planer table, each block having an intermediate post rising therefrom, a work engaging jaw rising from the post whereby work may be engaged by the jaw with the work supported on the post, other jaws at the sides of the post for engaging work there presented, and means carried by the block for supporting work engaged by the side jaws.

In testimony, that I claim the foregoing as my own, I have hereto affixed my signature.

TIMOTHY C. FOLEY.